US009847685B2

(12) United States Patent
Nakagawa

(10) Patent No.: US 9,847,685 B2
(45) Date of Patent: Dec. 19, 2017

(54) COIL

(71) Applicant: AISIN AW CO., LTD., Anjo-shi, Aichi-ken (JP)

(72) Inventor: Yoshinari Nakagawa, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 420 days.

(21) Appl. No.: 14/379,920

(22) PCT Filed: Dec. 13, 2012

(86) PCT No.: PCT/JP2012/082404
§ 371 (c)(1),
(2) Date: Aug. 20, 2014

(87) PCT Pub. No.: WO2013/145459
PCT Pub. Date: Oct. 3, 2013

(65) Prior Publication Data
US 2015/0061450 A1 Mar. 5, 2015

(30) Foreign Application Priority Data

Mar. 29, 2012 (JP) .................................. 2012-077482

(51) Int. Cl.
*H02K 3/12* (2006.01)
*H02K 3/28* (2006.01)
(52) U.S. Cl.
CPC ................. *H02K 3/28* (2013.01); *H02K 3/12* (2013.01)
(58) Field of Classification Search
CPC ..................................... H02K 3/12; H02K 3/28
(Continued)

(56) References Cited

U.S. PATENT DOCUMENTS 5,898,251 A * 4/1999 Mochizuki ............... H02K 3/28
29/596
6,544,009 B2 * 4/2003 Makino .................. H02K 1/185
310/216.003
(Continued)

FOREIGN PATENT DOCUMENTS

JP A-06-225491 8/1994
JP 2001275292 A * 10/2001
(Continued)

OTHER PUBLICATIONS

Oikawa et al., Machine Translation of JP2001275292, dated Oct. 2001.*

(Continued)

*Primary Examiner* — Quyen Leung
*Assistant Examiner* — Eric Johnson
(74) *Attorney, Agent, or Firm* — Oliff PLC

(57) ABSTRACT

A coil that is wound around a core having a plurality of slots arranged so as to be distributed in a circumferential direction of a cylindrical core reference plane, and that has N (where N is an integer of 2 or more) star connections. Each of the N star connections includes three phase coil portions corresponding to respective three phases, and first ends of the three phase coil portions are connected together at a neutral point that is formed independently for each of the star connections, second ends of the N phase coil portions of the same phase which are included in the different star connections are connected to each other, a phase coil placement region where the phase coil portion is placed is designed to be continuous in the circumferential direction.

6 Claims, 9 Drawing Sheets

(58) Field of Classification Search
USPC .................................. 310/195, 198, 201–208
See application file for complete search history.

(56) References Cited

U.S. PATENT DOCUMENTS

| | | | | |
|---|---|---|---|---|
| 2006/0152188 A1* | 7/2006 | Yasuhara | ................. | H02K 3/28 318/727 |
| 2008/0174196 A1 | 7/2008 | Hattori | | |
| 2010/0187941 A1* | 7/2010 | Roth | ........................ | H02K 3/28 310/203 |
| 2013/0127290 A1* | 5/2013 | Matsubara | ............... | H02K 3/38 310/208 |

FOREIGN PATENT DOCUMENTS

| JP | A-2006-311733 | 11/2006 | | |
|---|---|---|---|---|
| JP | A-2009-131058 | 6/2009 | | |
| JP | A-2011-004457 | 1/2011 | | |
| WO | WO 2012011299 A1 * | 1/2012 | ............... | H02K 3/38 |

OTHER PUBLICATIONS

Hattori et al., Machine Translation of JP06225491, dated Dec. 1994.*

* cited by examiner

COIL

TECHNICAL FIELD

The present invention relates to coils that are wound around a core having a plurality of slots arranged so as to be distributed in a circumferential direction of a cylindrical core reference plane, and that have a plurality of star connections.

BACKGROUND ART

For example, there is a technique described in Japanese Patent Application Publication No. 2006-311733 (JP 2006-311733 A) (Patent Document 1) as related art of such coils as described above. Patent Document 1 discloses a coil having two star connections (Y-connections), in which a common neutral point having respective one ends of phase coil portions of each phase connected thereto is provided for the two star connections. In the configuration described in Patent Document 1, each of the two phase coil portions of the same phase which form a parallel circuit (series coil A and series coil B shown in FIG. 5 of Patent Document 1) is formed by two coil groups that are arranged so as to face each other in the radial direction, as shown in FIG. 4 of the document. Thus, even if a stator around which the coil is wound and a rotor that is placed so as to be rotatable with respect to the stator are eccentric with each other, electromagnetic balance is maintained, and generation of a circulating current in the parallel circuit can be suppressed.

In the configuration of Patent Document 1, however, another coil group forming another phase coil portion of the same phase is placed between the two coil groups forming the same phase coil portion in the circumferential direction. This requires jumper lines connecting the two coil groups to be placed so as to overlap another coil group in the circumferential direction. The configuration of Patent Document 1 therefore complicates a coil winding process of winding the coil around a core, and may increase time required for the coil winding process and cost of facilities for the coil winding process.

RELATED ART DOCUMENT

Patent Document

[Patent Document 1] Japanese Patent Application Publication No. 2006-311733 (JP 2006-311733 A) (paragraphs 0023 to 0025, 0030, etc.)

SUMMARY OF THE INVENTION

Problem to be Solved by the Invention

It is therefore desired to implement a coil capable of suppressing an increase in time and facility cost for a coil winding process and capable of suppressing generation of a circulating current.

Means for Solving the Problem

According to the present invention, a coil that is wound around a core having a plurality of slots arranged so as to be distributed in a circumferential direction of a cylindrical core reference plane, and that have N (where N is an integer of 2 or more) star connections is characterized in that each of the N star connections includes three phase coil portions corresponding to respective three phases, and first ends of the three phase coil portions are connected together at a neutral point that is formed independently for each of the star connections, second ends of the N phase coil portions of the same phase which are included in the different star connections are connected to each other, a phase coil placement region where the phase coil portion is placed is designed to be continuous in the circumferential direction, and is disposed so as not to overlap the phase coil placement region where the other (N−1) phase coil portion of the same phase is placed, as viewed in a radial direction, and a center position in the circumferential direction of each of the phase coil portions is designed to be located 120° away in the circumferential direction from center positions in the circumferential direction of the phase coil portions of the other phases which are included in the same star connection.

According to the above characteristic configuration, the first ends of the three phase coil portions included in the same star connection are connected together at the neutral point that is formed independently for each of the star connections, and the second ends of the N phase coil portions of the same phase which are included in the different star connections are connected to each other. Accordingly, in the present invention, each shunt of a parallel circuit in which a circulating current can be generated is formed by a series connection formed by connecting the two phase coil portions included in the same star connection in series via the neutral point. According to the above characteristic configuration, the center position in the circumferential direction of each of the phase coil portions is designed to be located 120° away in the circumferential direction from the center positions in the circumferential direction of the phase coil portions of the other phases which are included in the same star connection. That is, the center positions in the circumferential direction of the three phase coil portions included in the same star connection are arranged so as to be distributed at regular intervals in the circumferential direction.

In the case where the coil is a coil for rotating electrical machines, a counter electromotive voltage is generated in each phase coil portion by rotation of a rotor of the rotating electrical machine. In a concentric state where rotation axial centers of the rotor and a stator of the rotating electrical machine are concentrically located, a counter electromotive voltage of the same magnitude (amplitude) (hereinafter referred to as the "reference counter electromotive voltage") is designed to be generated in each of the phase coil portions. On the other hand, in an eccentric state where the rotation axial centers of the rotor and the stator of the rotating electrical machine are off-center with respect to each other, the magnitude of the counter electromotive voltage that is generated with rotation of the rotor changes as compared to the case of the concentric state. According to the above characteristic configuration, as described above, the center positions in the circumferential direction of the three phase coil portions included in the same star connection are arranged so as to be distributed at regular intervals in the circumferential direction. This can suppress, regardless of the direction of the eccentricity, variation among the three phase coil portions included in the same star connection in the magnitude of a change in counter electromotive voltage generated in the eccentric state from the reference counter electromotive voltage and the direction of the change. A counter electromotive voltage that is generated between both ends of the series connection formed by the two phase coil portions is determined as the sum of counter electromotive voltages that are generated in these respective two phase coil portions. The above characteristic configuration can therefore suppress an increase in difference in counter electromotive voltage that is generated in the eccentric state between or among the plurality of series connections forming the same parallel circuit, and can suppress generation of the circulating current that causes vibration or noise or causes an increase in loss.

Moreover, according to the above characteristic configuration, the phase coil placement region where the phase coil portion is placed is designed to be continuous in the circumferential direction, and is disposed so as not to overlap the phase coil placement region where the other (N−1) phase coil portion of the same phase is placed, as viewed in the radial direction. Accordingly, as compared to the case where the phase coil placement region is a region that is discontinuous in the circumferential direction, the width in the circumferential direction of the phase coil placement region can be reduced, and the plurality of phase coil portions of the same phase can be arranged without causing their positions in the circumferential direction to overlap each other. This can simplify a coil winding process of winding the coil around the core, and thus can suppress an increase in time required for the coil winding process and an increase in facility cost for the coil winding process.

As described above, the above characteristic configuration can suppress an increase in time and facility cost for the coil winding process, and can suppress generation of the circulating current.

It is preferable that the phase coil portion include a plurality of unit coil portions each having a plurality of turns between a pair of slots or having pluralities of turns between multiple pairs of slots, and the plurality of unit coil portions included in the same phase coil portion be arranged in the same order in the circumferential direction as order of electrical connection.

According to this configuration, as compared to the case where the arrangement order of the plurality of unit coil portions in the circumferential direction is different from the order of electrical connection thereof, jumper lines connecting the unit coil portions can be reduced in length, and a coil end portion can be reduced in size. Moreover, a potential difference between adjoining ones of the unit coil portions can be reduced, whereby electrical insulation properties of the coil can be easily secured.

It is preferable that the phase coil placement region where the phase coil portion is placed be disposed so as to partially overlap the phase coil placement regions where the phase coil portions of the other phases are placed, as viewed in the radial direction.

According to this configuration, a harmonic component included in a rotating magnetic field formed by the coil can be reduced. This can suppress production of vibration and noise during operation of the rotating electrical machine in the case where the coil is a coil for rotating electrical machines.

MODES FOR CARRYING OUT THE INVENTION

1. First Embodiment

Figure 1:
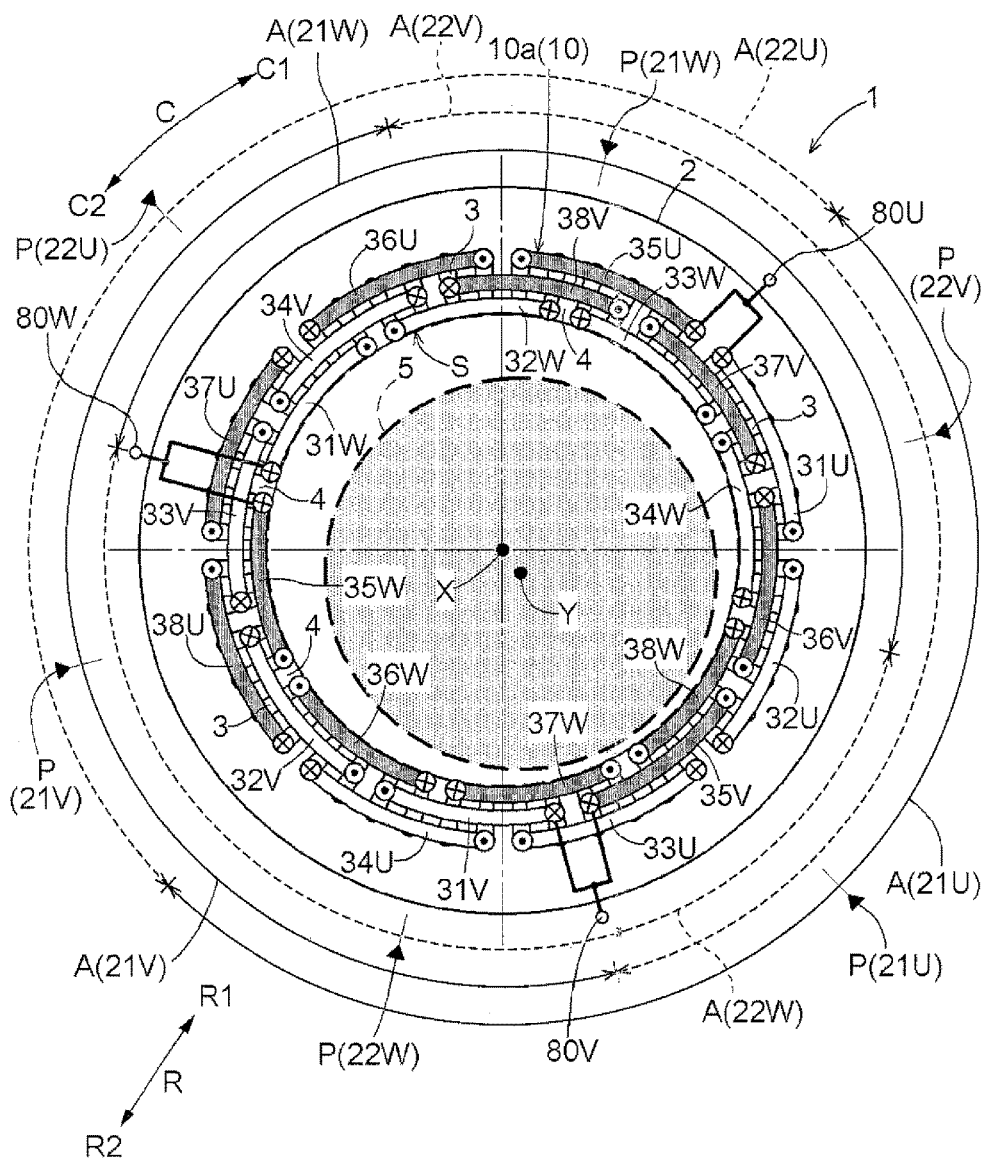
FIG. 1 is a diagram of a stator according to a first embodiment of the present invention as viewed in the axial direction.

A first embodiment of a coil according to the present invention will be described with reference to the accompanying drawings. The coil according to the present invention will be described with respect to an example in which the coil is applied to a coil for rotating electrical machines, specifically an example in which the coil is applied to a coil 10 (see FIG. 1) that is wound around a stator core 2 of a stator 1. As shown in FIG. 1, the stator 1 according to the present embodiment is a stator for inner rotor type rotating electrical machines. As used herein, the term "rotating electrical machine" is used as a concept including all of a motor (electric motor), a generator (electric generator), and a motor-generator that functions both as a motor and as a generator as necessary. In the present embodiment, the stator core 2 corresponds to the "core" in the present invention.

In the following description, the "axial direction", the "circumferential direction C," and the "radial direction R" are defined based on an axial center of a cylindrical core reference plane S (see FIG. 1) unless otherwise specified. As described below, the axial center of the core reference plane S matches a stator axial center X in the present embodiment. The "circumferential first direction C1" and the "circumferential second direction C2" represent the clockwise direction and the counterclockwise direction, respectively, as the coil 10 or the stator core 2 is viewed along the axial center (axial direction) of the core reference plane S from the side of one of coil end portions 10a located on both sides in the axial direction, i.e., the coil end portion 10a to which power supply terminals 80U, 80V, 80W are connected (see FIG. 1). The "radial first direction R1" and the "radial second direction R2" represent the direction inward in the radial direction R of the core reference plane S and the direction outward in the radial direction R of the core reference plane S, respectively. In the following description, the terms regarding the direction, position, etc. of each member are used as a concept including a margin for error (an acceptable margin for manufacturing error).

1-1. Overall Configuration of Stator

The overall configuration of the stator 1 according to the present embodiment will be described with reference to FIG. 1. The stator 1 is a stator as an armature for a rotating electrical machine, and includes the stator core 2 and the coil 10 that is wound around the stator core 2. The stator core 2 is formed by using a magnetic material, A rotor 5 as a field including a permanent magnet, an electromagnet, etc. is placed on the radial first direction R1 side (radially inward) of the stator core 2. That is, the rotating electrical machine according to the present embodiment is an inner rotor, revolving field type rotating electrical machine. FIG. 1 shows the rotor 5 in a simplified manner, and shows only the outer peripheral surface (portion shown by broken line) of the rotor 5 and a rotor axial center Y as an axial center of the rotor 5 or a rotor core. FIG. 1 shows an eccentric state where the rotor 5 is off-center toward the lower right side in FIG. 1 with respect to the stator 1 due to an assembly error etc. and the rotor axial center Y does not match the stator axial center X. In such an eccentric state, the size of an air gap as a gap in the radial direction R between the stator 1 and the rotor 5 is not uniform in the circumferential direction C.

A plurality of slots 3 are arranged in the stator core 2 so as to be distributed in the circumferential direction C. A tooth 4 is formed between every two of the slots 3 which adjoin each other in the circumferential direction C. The "cylindrical core reference plane S" described above is an imaginary plane that is used as a reference for the arrangement and configuration of the slots 3. In the present embodiment, the core reference plane S is a cylindrical imaginary plane including the end faces on the radial first direction R1 side of the plurality (the same number as the slots 3) of teeth 4 (core inner peripheral surface). In the present embodiment, the axial center of the core reference plane S therefore matches the stator axial center X as an axial center of the stator 1 or the stator core 2. The core reference plane S may be a plane on a radial second direction R2 side of the stator core 2 (core outer peripheral surface), etc.

The plurality of slots 3 are arranged so as to be distributed at regular intervals in the circumferential direction C. The slots 3 are formed in the same shape. Specifically, the slots 3 extend in the axial direction and extend through the stator core 2 in the axial direction. The slots 3 are formed so as to open in the radial first direction R1 (open to the core inner peripheral surface) and to extend in a radial fashion from the stator axial center X in the radial direction R.

Figure 2:
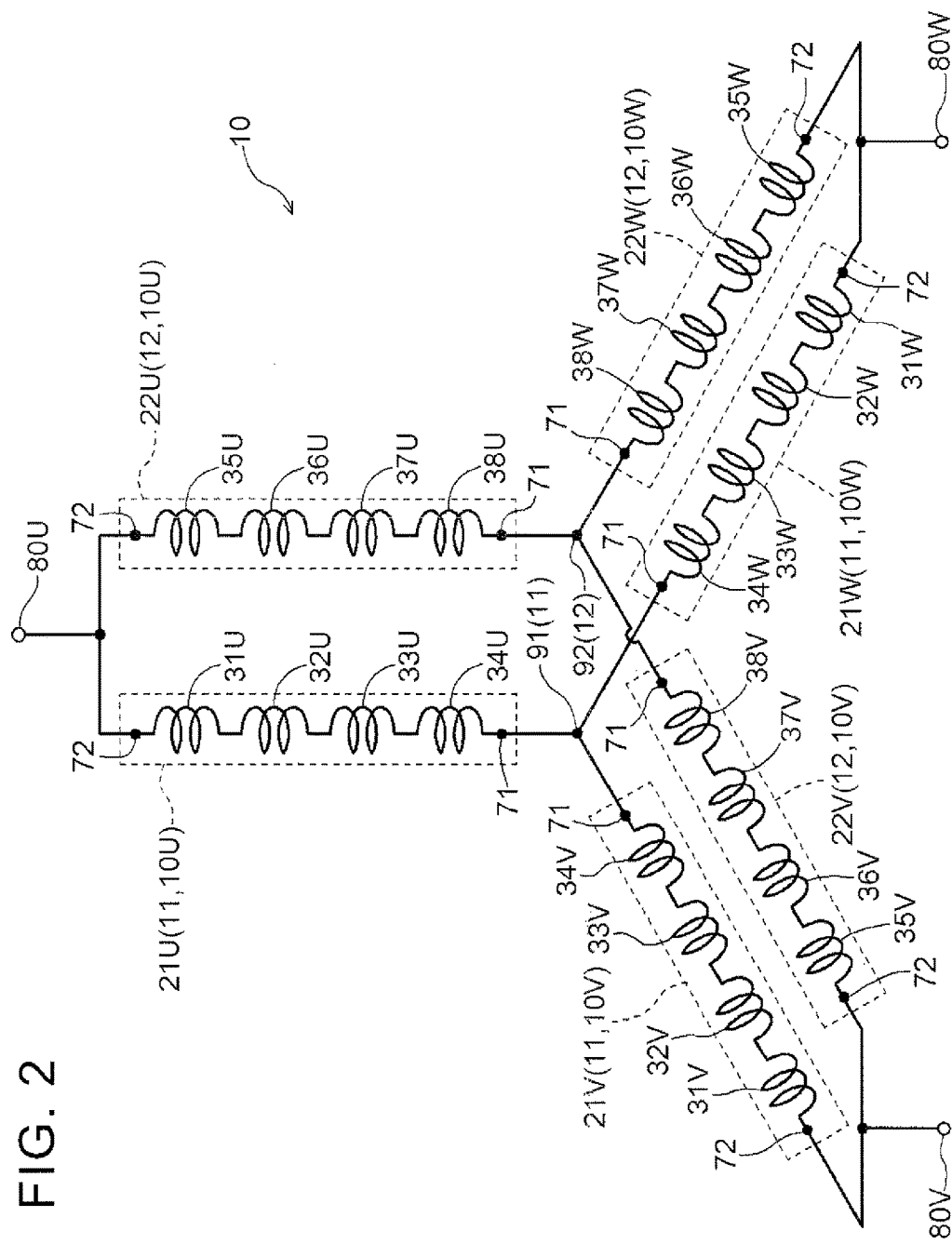
FIG. 2 is a connection diagram of a coil according to the first embodiment of the present invention.

The rotating electrical machine is an alternating current (AC) electric motor that is driven by a three-phase alternating current, and the coil 10 includes a U-phase coil 10U, a V-phase coil 10V, and a W-phase coil 10W corresponding to three phases (U-phase as a first phase, V-phase as a second phase, and W-phase as a third phase) (see FIG. 2). The slots 3 for U-phase, V-phase, and W-phase are arranged in the stator core 2 in a repeated pattern of U-phase, V-phase, and W-phase in the circumferential direction C. In the present embodiment, the number of slots per pole per phase is "2," and the slots 3 for each phase are arranged in the stator core 2 in a repeated pattern of two slots for U-phase, two slots for V-phase, and two slots for W-phase in the circumferential direction C. In the present embodiment, the number of magnetic poles per phase is "8," and a total of 48 (=2×8×3) slots 3 are provided in the stator core 2.

1-2. Configuration of Coil

The configuration of the coil 10 as a main part of the present invention will be described below. The coil 10 has N (where N is an integer of 2 or more) star connections 11, 12. In the present embodiment, "N" is a value of 2 or more out of the divisors of the number of magnetic poles per pole (in this example, "8"). In this example, as shown in FIG. 2, "N" is set to "2," and the coil 10 has two star connections, namely the first star connection 11 and the second star connection 12. The coil 10 is formed by linear conductors as conductors having a linear shape. For example, the linear conductors are made of a metal such as copper or aluminum. A conductor formed of a stranded wire of a plurality of thin wires, a conductor whose sectional shape perpendicular to the extending direction of the conductor corresponds to the sectional shape of the slot 3 (e.g., a rectangular sectional shape), etc. can be used as such a linear conductor.

Each of the N (in this example, 2) star connections 11, 12 includes three phase coil portions corresponding to the respective three phases, and first ends 71 of the three phase coil portions are connected together at a neutral point 91, 92 formed independently for each star connection 11, 12. That is, the three phase coil portions are star-connected (Y-connected) to form the single star connection 11, 12. Specifically, as shown in FIG. 2, the first star connection 11 includes a first U-phase phase coil portion 21U corresponding to U-phase, a first V-phase phase coil portion 21V corresponding to V-phase, and a first W-phase phase coil portion 21W corresponding to W-phase. The first end 71 of the first U-phase phase coil portion 21U, the first end 71 of the first V-phase phase coil portion 21V, and the first end 71 of the first W-phase phase coil portion 21W are connected to each other at the first neutral point 91. The second star connection 12 includes a second U-phase phase coil portion 22U corresponding to U-phase, a second V-phase phase coil portion 22V corresponding to V-phase, and a second W-phase phase coil portion 22W corresponding to W-phase. The first end 71 of the second U-phase phase coil portion 22U, the first end 71 of the second V-phase phase coil portion 22V, and the first end 71 of the second W-phase phase coil portion 22W are connected to each other at the second neutral point 92. As shown in FIG. 2, the first neutral point 91 and the second neutral point 92 are formed independently of each other, and are not directly connected together, but electrically connected together via a circuit element (in this example, the phase coil portions).

Second ends 72 of N (in this example, 2) phase coil portions of the same phase included in the different star connections 11, 12 are connected to each other. Specifically, as shown in FIG. 2, the second end 72 of the first U-phase phase coil portion 21U included in the first star connection 11 and the second end 72 of the second U-phase phase coil portion 22U included in the second star connection 12 are connected to each other. The second end 72 of the first V-phase phase coil portion 21V included in the first star connection 11 and the second end 72 of the second V-phase phase coil portion 22V included in the second star connection 12 are connected to each other. The second end 72 of the first W-phase phase coil portion 21W included in the first star connection 11 and the second end 72 of the second W-phase phase coil portion 22W included in the second star connection 12 are connected to each other.

As shown in FIG. 2, the second ends 72 of the U-phase phase coil portions 21U, 22U are connected to the U-phase power supply terminal 80U, the second ends 72 of the V-phase phase coil portions 21V, 22V are connected to the V-phase power supply terminal 80V, and the second ends 72 of the W-phase phase coil portions 21W, 22W are connected to the W-phase power supply terminal 80W. Each of the power supply terminals 80U, 80V, 80W is a terminal that connects a lead (power line) connecting the rotating electrical machine and an inverter (not shown). As schematically shown in FIG. 1, in the present embodiment, all of the U-phase power supply terminal 80U, the V-phase power supply terminal 80V, and the W-phase power supply terminal 80W are connected to the coil end portion 10a on the same side in the axial direction of the stator core 2 (in FIG. 1, the side closer to the viewer of the figure).

In the present embodiment, each of the three phase coil portions included in each star connection 11, 12 includes a plurality of unit coil portions. The unit coil portion is a coil portion having a plurality of turns between a pair of slots or having pluralities of turns between multiple pairs of slots 3, and each of the plurality of unit coil portions forms a magnetic pole. The unit coil portion has coil side portions that are placed in the slots 3, and turn portions that connect the coil side portions together. The turn portion is formed by a part of the unit coil portion which protrudes from the stator core 2 in the axial direction. The coil end portion 10a is formed by the turn portions, and jumper portions (jumper lines) each placed outside the stator core 2 in the axial direction and connecting two of the unit coil portions. FIG. 1 shows only the turn portions, and does not show the jumper portions and connection members that connect the coil end portion 10a and the neutral points 91, 92 (see FIG. 2). FIG. 1 does not show connection members that connect the coil end portion 10a and the power supply terminals 80U, 80V, 80W, and shows only the relation of connection between the coil end portion 10a and the power supply terminals 80U, 80V, 80W in a simplified manner.

In the present embodiment, the unit coil portion is a coil portion having a plurality of turns between a pair of slots 3. For example, the unit coil portion formed of a bundle of a plurality of linear conductors is formed by winding a single linear conductor a plurality of times (even or odd number of times). A single phase coil portion is formed by a plurality of (in this example, 4) unit coil portions connected in series. Specifically, as shown in FIG. 2, the first U-phase phase coil portion 21U includes a first U-phase unit coil portion 31U, a second U-phase unit coil portion 32U, a third U-phase unit coil portion 33U, and a fourth U-phase unit coil portion 34U from the second end 72 toward the first end 71 (i.e., in order of electrical connection). The second U-phase phase coil portion 22U includes a fifth U-phase unit coil portion 35U, a sixth U-phase unit coil portion 36U, a seventh U-phase unit coil portion 37U, and an eighth U-phase unit coil portion 38U from the second end 72 toward the first end 71 (i.e., in order of electrical connection).

As shown in FIG. 1, each of the U-phase unit coil portions 31U to 38U is wound between a pair of slots 3 separated from each other at a 5-slot pitch. That is, the plurality of coil side portions of the single U-phase unit coil portion 31U to 38U are disposed so as to be distributed in two slots 3 that are separated from each other at a 5-slot pitch. The plurality of U-phase unit coil portions 31U to 38U are disposed at a pitch of one magnetic pole (in this example, 6-slot pitch) in the circumferential direction C. That is, the coil side portion on the circumferential first direction C1 side of each of the U-phase unit coil portions 31U to 38U is disposed in the slot 3 adjoining in the circumferential second direction C2 the slot 3 in which the coil side portion on the circumferential second direction C2 side of another one of the U-phase unit coil portions 31U to 38U which adjoins this U-phase unit coil portion in the circumferential first direction C1.

In the present embodiment, the plurality of unit coil portions included in the same phase coil portion are arranged in the same order in the circumferential direction as the order of electrical connection. That is, in the present embodiment, a phase coil portion has an adjoining pole winding structure, and the plurality of unit coil portions included in the same phase coil portion are connected so that the unit coil portions having opposite winding directions to each other alternately appear in order of electrical connection.

Specifically, as shown in FIG. 1, the plurality of U-phase unit coil portions 31U to 34U included in the first U-phase phase coil portion 21U are arranged in order of the first U-phase unit coil portion 31U, the second U-phase unit coil portion 32U, the third U-phase unit coil portion 33U, and the fourth U-phase unit coil portion 34U in the circumferential first direction C1. The order of electrical connection of the plurality of U-phase unit coil portions 31U to 34U included in the first U-phase phase coil portion 21U (see FIG. 2) matches the order of arrangement thereof in the circumferential direction C. Similarly, the plurality of U-phase unit coil portions 35U to 38U included in the second U-phase phase coil portion 22U are arranged in order of the fifth U-phase unit coil portion 35U, the sixth U-phase unit coil portion 36U, the seventh U-phase unit coil portion 37U, and the eighth U-phase unit coil portion 38U in the circumferential second direction C2. The order of electrical connection of the plurality of U-phase unit coil portions 35U to 38U included in the second U-phase phase coil portion 22U (see FIG. 2) matches the order of arrangement thereof in the circumferential direction C.

In FIG. 1, in order to facilitate understanding of the invention, both ends in the circumferential direction C of each unit coil portion, which are portions where the coil side portions are disposed, are represented by white circles, and symbols representing the direction of current flow in the coil side portion are shown inside the white circles. Specifically, the symbol "×" in the white circle shows that a current flowing from the power supply terminal 80U, 80V, 80W toward the neutral point 91, 92 flows to the side farther from the viewer of FIG. 1, and the black dot in the white circle shows that the current flowing from the power supply terminal 80U, 80V, 80W toward the neutral point 91, 92 flows to the side closer to the viewer of FIG. 1.

As can be seen from FIG. 1, the first U-phase unit coil portion 31U, the third U-phase unit coil portion 33U, the sixth U-phase unit coil portion 36U, and the eighth U-phase unit coil portion 38U have the same winding direction, and form magnetic poles of the same polarity. The second U-phase unit coil portion 32U, the fourth U-phase unit coil portion 34U, the fifth U-phase unit coil portion 35U, and the seventh U-phase unit coil portion 37U have the same winding direction, and form magnetic poles of the same polarity. The U-phase unit coil portions 31U, 33U, 36U, 38U and the U-phase unit coil portions 32U, 34U, 35U, 37U have opposite winding directions to each other, and form magnetic poles of the opposite polarities to each other.

The first V-phase phase coil portion 21V is basically formed similarly to the first U-phase phase coil portion 21U except that the first U-phase unit coil portion 31U, the second U-phase unit coil portion 32U, the third U-phase unit coil portion 33U, and the fourth U-phase unit coil portion 34U are replaced with the first V-phase unit coil portion 31V, the second V-phase unit coil portion 32V, the third V-phase unit coil portion 33V, and the fourth V-phase unit coil portion 34V, respectively. The second V-phase phase coil portion 22V is basically formed similarly to the second U-phase phase coil portion 22U except that the fifth U-phase unit coil portion 35U, the sixth U-phase unit coil portion 36U, the seventh U-phase unit coil portion 37U, and the eighth U-phase unit coil portion 38U are replaced with the fifth V-phase unit coil portion 35V, the sixth V-phase unit coil portion 36V, the seventh V-phase unit coil portion 37V, and the eighth V-phase unit coil portion 38V, respectively.

Similarly, the first W-phase phase coil portion 21W is basically formed similarly to the first U-phase phase coil portion 21U except that the first U-phase unit coil portion 31U, the second U-phase unit coil portion 32U, the third U-phase unit coil portion 33U, and the fourth U-phase unit coil portion 34U are replaced with the first W-phase unit coil portion 31W, the second W-phase unit coil portion 32W, the third W-phase unit coil portion 33W, and the fourth W-phase unit coil portion 34W, respectively. The second W-phase phase coil portion 22W is basically formed similarly to the second U-phase phase coil portion 22U except that the fifth U-phase unit coil portion 35U, the sixth U-phase unit coil portion 36U, the seventh U-phase unit coil portion 37U, and the eighth U-phase unit coil portion 38U are replaced with the fifth W-phase unit coil portion 35W, the sixth W-phase unit coil portion 36W, the seventh W-phase unit coil portion 37W, and the eighth W-phase unit coil portion 38W, respectively.

As shown in FIG. 1, the V-phase coil 10V is placed so as to be shifted by 120° (in this example, at a 16-slot pitch) in the circumferential first direction C1 with respect to the U-phase coil 10U. That is, a center position P in the circumferential direction C of the first V-phase phase coil portion 21V is shifted by 120° in the circumferential first direction C1 with respect to a center position P in the circumferential direction C of the first U-phase phase coil portion 21U. A center position P in the circumferential direction C of the second V-phase phase coil portion 22V is shifted by 120° in the circumferential first direction C1 with respect to a center position P in the circumferential direction C of the second U-phase phase coil portion 22U. As shown in FIG. 1, the W-phase coil 10W is placed so as to be shifted by 120° in the circumferential first direction C1 with respect to the V-phase coil 10V. That is, a center position P in the circumferential direction C of the first W-phase phase coil portion 21W is shifted by 120° in the circumferential first direction C1 with respect to a center position P in the circumferential direction C of the first V-phase phase coil portion 21V. A center position P in the circumferential direction C of the second W-phase phase coil portion 22W is shifted by 120° in the circumferential first direction C1 with respect to a center position P in the circumferential direction C of the second V-phase phase coil portion 22V.

Accordingly, in the present embodiment, as shown in FIG. 1, the center position P in the circumferential direction C of the first U-phase phase coil portion 21U, the center position P in the circumferential direction C of the first V-phase phase coil portion 21V, and the center position P in the circumferential direction C of the first W-phase phase coil portion 21W are located at respective three equally spaced positions on the circumference. The center position P in the circumferential direction C of the second U-phase phase coil portion 22U, the center position P in the circumferential direction C of the second V-phase phase coil portion 22V, and the center position P in the circumferential direction C of the second W-phase phase coil portion 22W are located at respective three equally spaced positions on the circumference. The center position Pin the circumferential direction C of each phase coil portion is thus located 120° away in the circumferential direction C from the center positions P in the circumferential direction C of the phase coil portions of the other phases included in the same star connection 11, 12.

As shown in FIG. 1, a phase coil placement region A as a region in the circumferential direction C where the phase coil portion is placed is designed to be continuous in the circumferential direction C. As used herein, the expression "continuous in the circumferential direction C" is used as a concept including both the state having no discontinuity and the state having a discontinuity due to a gap having a width in the circumferential direction C which is equal to or smaller than a one-slot pitch. In the present embodiment, the phase coil portion includes a plurality of unit coil portions, and the phase coil placement region A is formed by a set of regions in the circumferential direction C where the plurality of unit coil portions are respectively placed.

For example, as shown in FIG. 1, the phase coil placement region A where the first U-phase phase coil portion 21U is placed is a set of regions where the first U-phase unit coil portion 31U, the second U-phase unit coil portion 32U, the third U-phase unit coil portion 33U, and the fourth U-phase unit coil portion 34U are respectively placed. In this case, a gap corresponding to the width in the circumferential direction C of the tooth 4 is formed between two of the U-phase unit coil portions 31U to 34U which adjoin each other in the circumferential direction C. However, the width in the circumferential direction C of this gap is equal to or smaller than a one-slot pitch, and the phase coil placement region A where the first U-phase phase coil portion 21U is formed so as to be continuous in the circumferential direction C. Regarding each of the second U-phase phase coil portion 22U, the first V-phase phase coil portion 21V, the second V-phase phase coil portion 22V, the first W-phase phase coil portion 21W, and the second W-phase phase coil portion 22W, the phase coil placement region A where the phase coil portion is placed is formed so as to be continuous in the circumferential direction C.

The phase coil placement region A where the phase coil portion is placed is disposed so as not to overlap the phase coil placement regions A where the other (N−1) (in this example, one) phase coil portions of the same phase are placed, as viewed in the radial direction R. That is, the entire phase coil placement region A is designed so as to be located outside (outside in the circumferential direction C) the phase coil placement regions A where the other phase coil portions of the same phase are placed. In the present embodiment, as shown in FIG. 1, each of the phase coil placement regions A has a length of 180° in the circumferential direction C (to be exact, 180° minus the width in the circumferential direction C of one tooth 4). In the present embodiment, the plurality of (in this example, two) phase coil placement regions A of the same phase (e.g., the phase coil placement region A where the first U-phase phase coil portion 21U is placed, and the phase coil placement region A where the second U-phase phase coil portion 22U is placed) are designed so as to be shifted by 180° with respect to each other in the circumferential direction C. Accordingly, in the present embodiment, as shown in FIG. 1, the center position P in the circumferential direction C of each coil portion is located 180° away in the circumferential direction C from the center positions P in the circumferential direction C of the other phase coil portions of the same phase.

In the present embodiment, each unit coil portion is wound between a pair of slots 3 that are separated from each other at a 5-slot pitch, and the unit coil portions of different phases are arranged so as to partially overlap each other as viewed in the radial direction R. Thus, regarding the phase coil formed by the unit coil portions as well, the phase coil portions of different phases are arranged so as to partially overlap each other as viewed in the radial direction R. As a result, in the present embodiment, the phase coil placement region A where each phase coil portion is placed is disposed so as to partially overlap the phase coil placement regions A where the phase coil portions of the other phases are placed, as viewed in the radial direction R.

In the present embodiment, as described above, each of the phase coil placement regions A has a length of 180° in the circumferential direction C. Accordingly, the plurality of phase coil portions included in the same star connection 11, 12 are arranged so as to be shifted by an angle of 120° with respect to each other in the circumferential direction C, and are arranged so as to partially overlap each other as viewed in the radial direction R. That is, in the present embodiment, the phase coil placement region A where the phase coil portion is placed is disposed so as to partially overlap the phase coil placement regions A where the phase coil portions of the other phases included in the same star connection 11, 12 are respectively placed, as viewed in the radial direction R.

Figure 7:
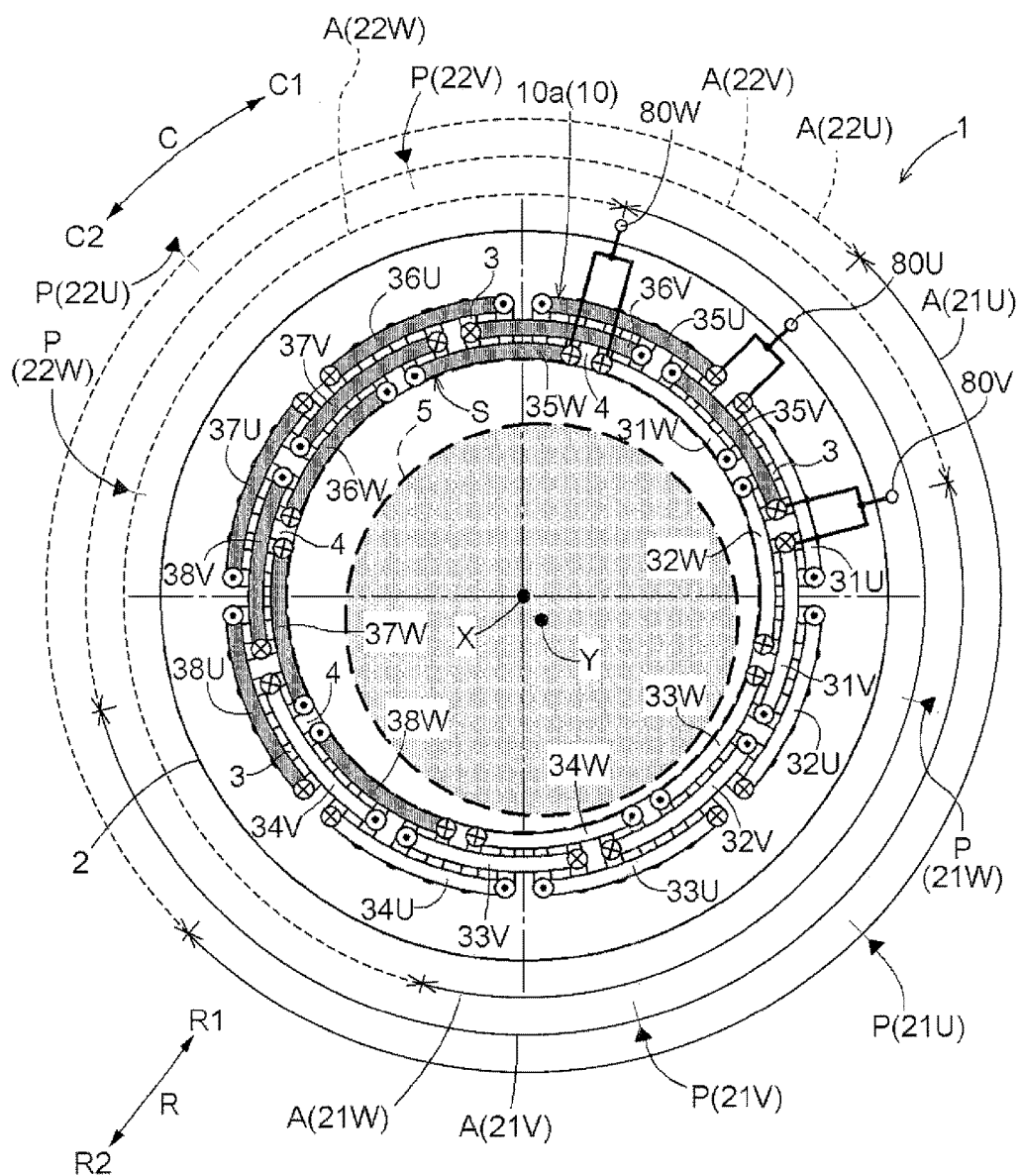
FIG. 7 is a diagram of a stator according to a comparative example as viewed in the axial direction.

The advantage that generation of a circulating current can be suppressed in the coil 10 of the present embodiment will be described with reference to a comparative example shown in FIG. 7. In the comparative example shown in FIG. 7 as well, the coil 10 is configured as shown in FIG. 2. However, unlike the present invention, the center position in the circumferential direction C of each phase coil portion is not designed to be located 120° away in the circumferential direction C from the center positions P in the circumferential direction C of the phase coil portions of the other phases included in the same star connection 11, 12. Specifically, the center positions P in the circumferential direction C of the three phase coil portions included in the same star connection 11, 12 are arranged at intervals of 30° in the circumferential direction C, as shown in FIG. 7.

Since the coil 10 according to the present embodiment is configured as shown in FIG. 2, a parallel circuit in which a circulating current can be generated in the state where the stator 1 and the rotor 5 are off-center with respect to each other (hereinafter referred to as the "eccentric state") is formed between two of the power supply terminals 80U, 80V, 80W, and each parallel circuit has N (in this example, two) shunts. Each shunt of the parallel circuit is formed by a series connection formed by connecting the two phase coil portions included in the same star connection 11, 12 in series via the neutral point 91, 92. In the present embodiment, since the phase coil portion is formed by connecting a plurality of unit coil portions in series, a counter electromotive voltage that is generated in the phase coil portion is the sum of counter electromotive voltages that are generated in the plurality of unit coil portions.

For example, as shown in FIG. 2, the parallel circuit formed between the U-phase power supply terminal 80U and the V-phase power supply terminal 80V has two shunts. One of the two shunts is formed by a series connection formed by connecting the first U-phase phase coil portion 21U and the first V-phase phase coil portion 21V in series via the first neutral point 91, and the other shunt is formed by a series connection formed by connecting the second U-phase phase coil portion 22U and the second V-phase phase coil portion 22V in series via the second neutral point 92. A counter electromotive voltage is generated in each phase coil portion as the rotor 5 rotates. However, reducing the difference in counter electromotive voltage between or among the plurality of (in this example, two) series connections forming the same parallel circuit can suppress a circulating current in this parallel circuit.

In this regard, in the coil 10 according to the present embodiment, as shown in FIG. 1, the center position P in the circumferential direction C of each phase coil portion is designed to be located 120° away in the circumferential direction C from the center positions P in the circumferential direction C of the phase coil portion of the other phases included in the same star connection 11, 12. This can suppress, regardless of the direction of the eccentricity, variation among the three phase coil portions included in the same star connection 11, 12 in the magnitude of a change in counter electromotive voltage generated in the eccentric state from a reference counter electromotive voltage and the direction of the change, and can reduce the difference in counter electromotive voltage between or among the plurality of series connections forming the same parallel circuit, as shown by the simulation result described below. As used herein, the term "reference counter electromotive voltage" is a counter electromotive voltage that is generated in the phase coil portion in the state where the stator 1 and the rotor 5 are concentrically arranged (hereinafter referred to as the "concentric state"), and the reference counter electromotive voltage is designed to have the same value (amplitude) for all the phase coil portions.

Figure 3:
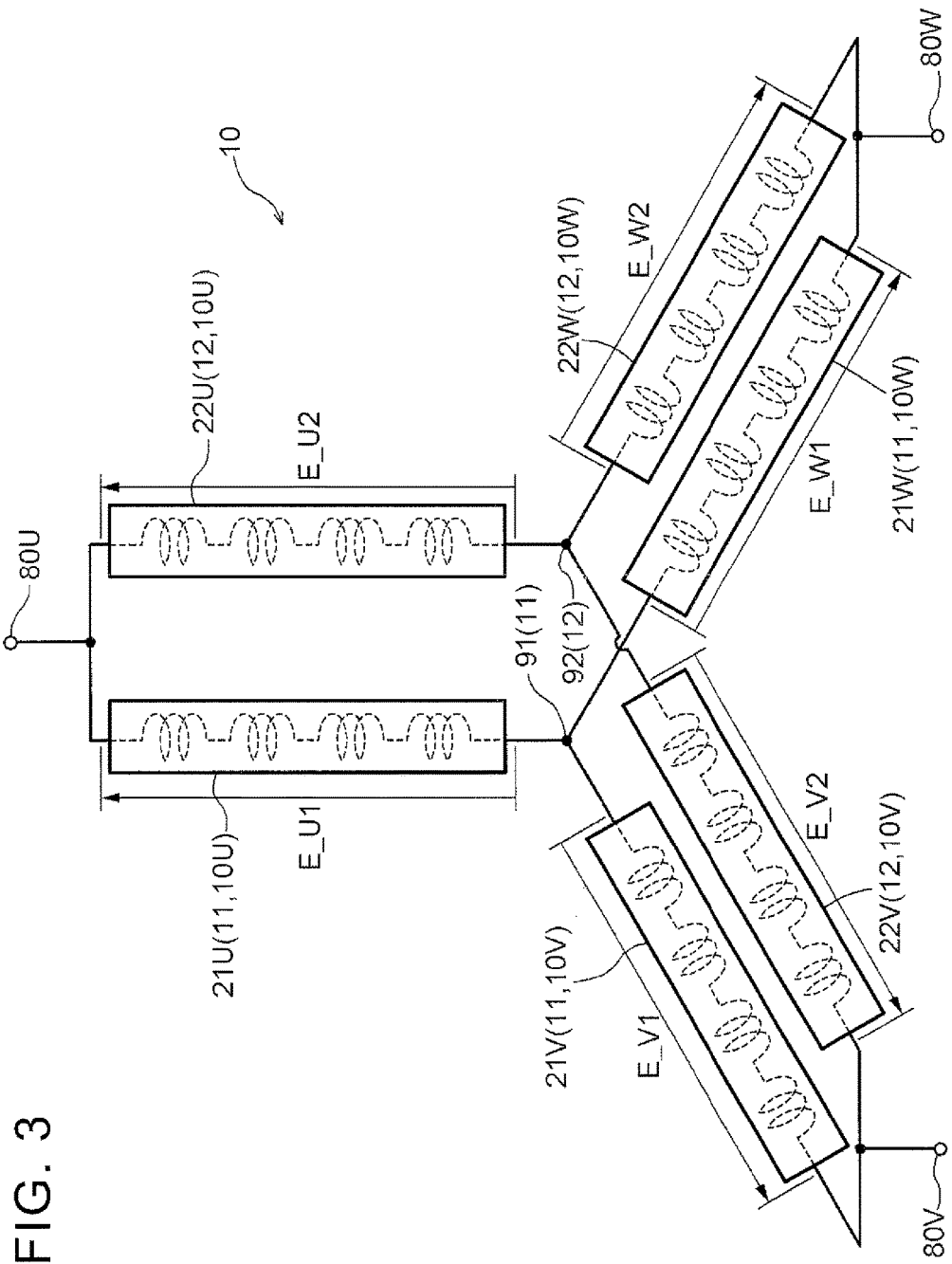
FIG. 3 is a simplified connection diagram of the coil according to the first embodiment of the present invention.
Figure 4:
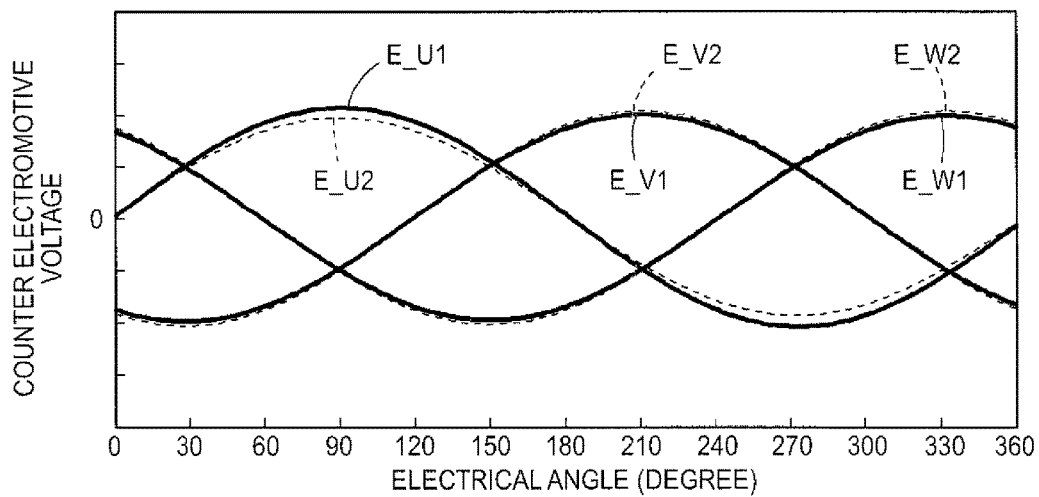
FIG. 4 is a diagram showing an example of a change in counter electromotive voltage generated in each phase coil portion with respect to the electrical angle according to the first embodiment of the present invention.
Figure 5:
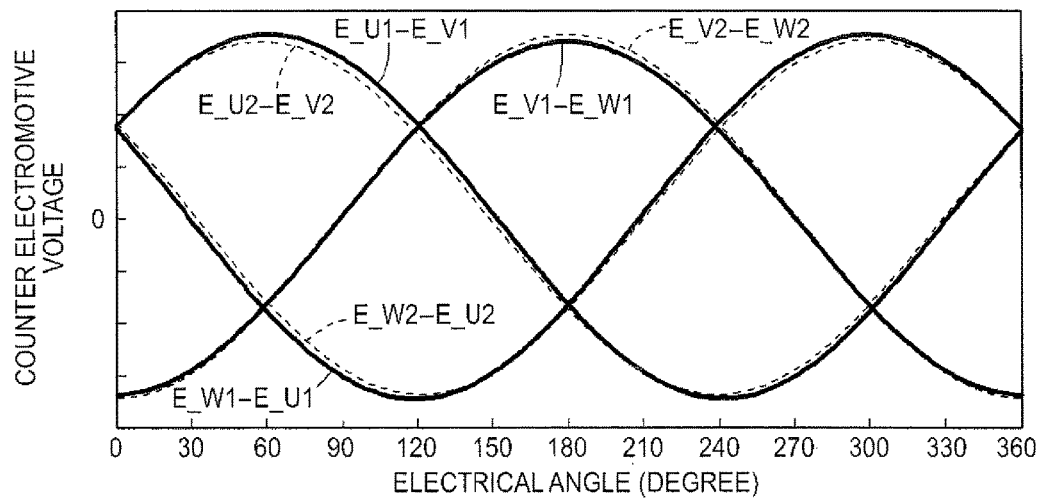
FIG. 5 is a diagram showing an example of a change in counter electromotive voltage generated in each series connection formed by connecting two phase coil portions in series with respect to the electrical angle according to the first embodiment of the present invention.
Figure 6:
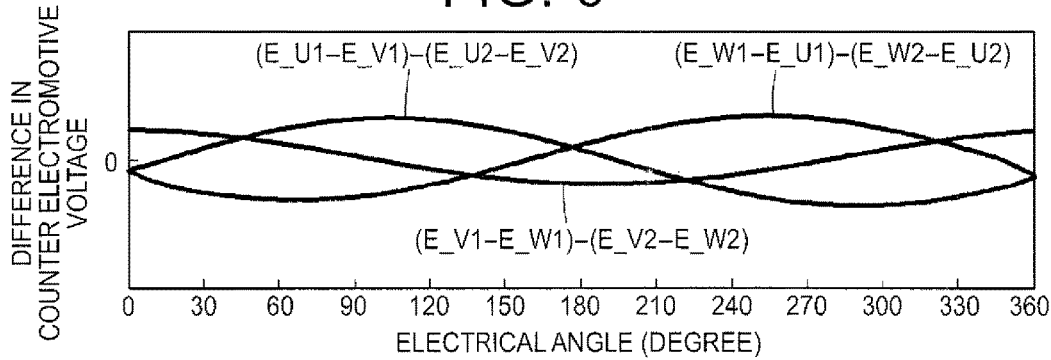
FIG. 6 is a diagram showing an example of a change in difference in counter electromotive voltage between two series connections connected to the same power supply terminal with respect to the electrical angle according to the first embodiment of the present invention.
Figure 8:
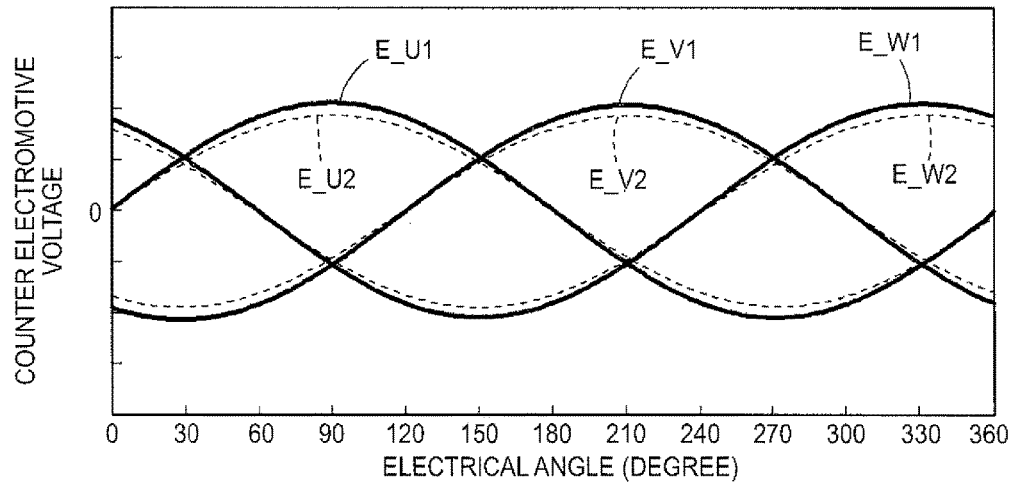
FIG. 8 is a diagram showing an example of a change in counter electromotive voltage generated in each phase coil portion with respect to the electrical angle according to the comparative example.
Figure 9:
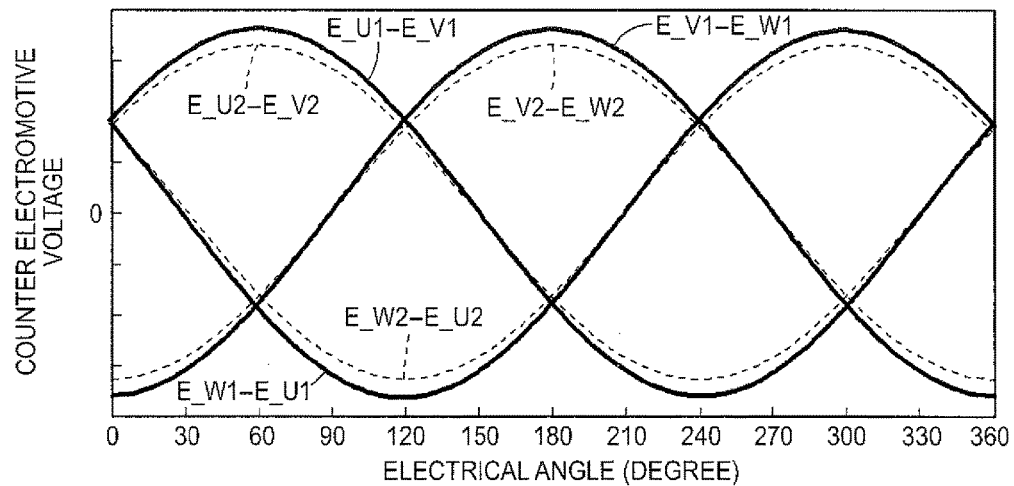
FIG. 9 is a diagram showing an example of a change in counter electromotive voltage generated in each series connection formed by connecting two phase coil portions in series with respect to the electrical angle according to the comparative example.
Figure 10:
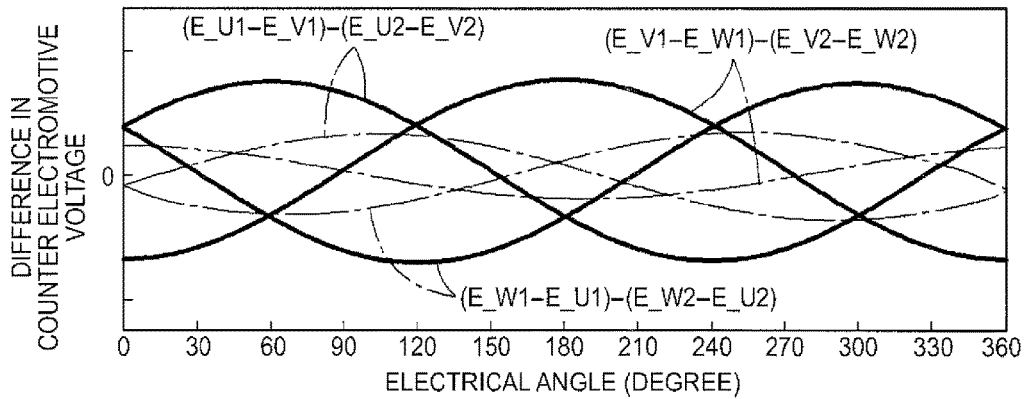
FIG. 10 is a diagram showing an example of a change in difference in counter electromotive voltage between two series connections connected to the same power supply terminal with respect to the electrical angle according to the comparative example.

FIGS. 4 to 6 are diagrams showing the simulation result for such an eccentric state as shown in FIG. 1. In each of these figures, "E_U1," "E_U2," "E_V1," "E_V2," "E_W1," and "E_W2" represent the voltages defined for the phase coil portions as shown in FIG. 3. FIG. 4 shows distribution of the counter electromotive voltage generated in each phase coil portion, and FIG. 5 shows distribution of the counter electromotive voltage generated between both ends of each series connection formed by two phase coil portions. For example, "E_U1-E_V1" in FIG. 5 represents the voltage between both ends of the series connection formed by the first U-phase phase coil portion 21U and the first V-phase phase coil portion 21V. FIG. 6 shows distribution of the difference in counter electromotive voltage between two series connections forming the same parallel circuit. FIGS. 8 to 10 show the simulation result of the comparative example shown in FIG. 7. FIG. 8 corresponds to FIG. 4, FIG. 9 corresponds to FIG. 5, and FIG. 10 corresponds to FIG. 6.

It is herein assumed that the rotor 5 is off-center toward the lower right side in FIG. 1 with respect to the stator 1, as shown in FIG. 1. The center position P in the circumferential direction C of the first U-phase phase coil portion 21U is located approximately on the lower right side in FIG. 1. As shown in FIG. 4, regarding the first U-phase phase coil portion 21U of the three phase coil portions 21U, 21V, 21W included in the first star connection 11, the size of an air gap at the center position P in the circumferential direction C is therefore smaller than that in the concentric state, and thus a counter electromotive voltage higher than the reference counter electromotive voltage is generated. Although FIG. 4 does not show the reference counter electromotive voltage, the reference counter electromotive voltage for the U-phase phase coil portions 21U, 22U is approximately the same as the average of the waveform of E_U1 and the waveform of E_U2. The same applies to the reference counter electromotive voltages for the V-phase phase coil portions 21V, 22V and the W-phase phase coil portions 21W, 22W.

On the other hand, regarding the first V-phase phase coil portion 21V and the first W-phase phase coil portion 21W, the size of an air gap at the center position P in the circumferential direction C is larger than that in the concentric state, and thus a counter electromotive voltage lower than the reference counter electromotive voltage is generated. In this case, the center position P in the circumferential direction C of the first V-phase phase coil portion 21V and the center position P in the circumferential direction C of the first W-phase phase coil portion 21W are designed to be located 120° away in the circumferential direction C from the center position P in the circumferential direction C of the first U-phase phase coil portion 21U. Accordingly, a variation in counter electromotive voltage from the reference counter electromotive voltage in the first V-phase phase coil portion 21V and the first W-phase phase coil portion 21W is smaller than that in counter electromotive voltage from the reference counter electromotive voltage in the first U-phase phase coil portion 21U.

As described above, in the coil 10 according to the present embodiment, variation among the first U-phase phase coil portion 21U, the first V-phase phase coil portion 21V, and the first W-phase phase coil portion 21W of the first star connection 11 can be suppressed in the magnitude of a change in counter electromotive voltage generated in the eccentric state from the reference counter electromotive voltage and the direction of the change. Although not described herein, as shown in FIG. 4, even variation among the second U-phase phase coil portion 22U, the second V-phase phase coil portion 22V, and the second W-phase phase coil portion 22W of the second star connection 12 can be suppressed in the magnitude of a change in counter electromotive voltage generated in the eccentric state from the reference counter electromotive voltage and the direction of the change.

On the other hand, in the coil 10 according to the comparative example (see FIG. 7), as shown in FIG. 8, the magnitude of a change in counter electromotive voltage generated in the eccentric state from the reference counter electromotive voltage and the direction of the change vary among the first U-phase phase coil portion 21U, the first V-phase phase coil portion 21V, and the first W-phase phase coil portion 21W of the first star connection 11. Specifically, in all of the first U-phase phase coil portion 21U, the first V-phase phase coil portion 21V, and the first W-phase phase coil portion 21W, the generated counter electromotive voltage is higher than the reference counter electromotive voltage, and a variation in counter electromotive voltage from the reference counter electromotive voltage is substantially the same. That is, the direction of a change in counter electromotive voltage generated in the eccentric state from the reference counter electromotive voltage is the same, and the magnitude of the change in counter electromotive voltage generated in the eccentric state from the reference counter electromotive voltage is substantially the same in all of the first U-phase phase coil portion 21U, the first V-phase phase coil portion 21V, and the first W-phase phase coil portion 21W included in the first star connection 11. Although not described herein, as shown in FIG. 8, the magnitude of a change in counter electromotive voltage generated in the eccentric state from the reference counter electromotive voltage and the direction of the change vary even among the second U-phase phase coil portion 22U, the second V-phase phase coil portion 22V, and the second W-phase phase coil portion 22W of the second star connection 12.

As a result, as can be seen from the comparison between FIG. 6 and FIG. 10 according to the comparative example, the difference in counter electromotive voltage between or among the plurality of series connections forming the same parallel circuit can be reduced in the coil 10 according to the present embodiment. In order to facilitate understanding of the invention, the waveforms of the present embodiment shown in FIG. 6 are shown by chain lines in FIG. 10.

In the present embodiment, as described above, the center position P in the circumferential direction C of each phase coil portion is designed to be located 180° away in the circumferential direction C from the center positions P in the circumferential direction C of the other phase coil portions of the same phase. Accordingly, the direction of a change in counter electromotive voltage generated in the eccentric state from the counter electromotive voltage is basically opposite between the two phase coil portions of the same phase.

2. Second Embodiment

A second embodiment of the coil according to the present invention will be described with reference to FIGS. 11 and 12. The present embodiment is different from the first embodiment in that "N" is "4." The differences from the first embodiment will be mainly described below, and the second embodiment is similar to the first embodiment unless otherwise specified.

Figure 12:
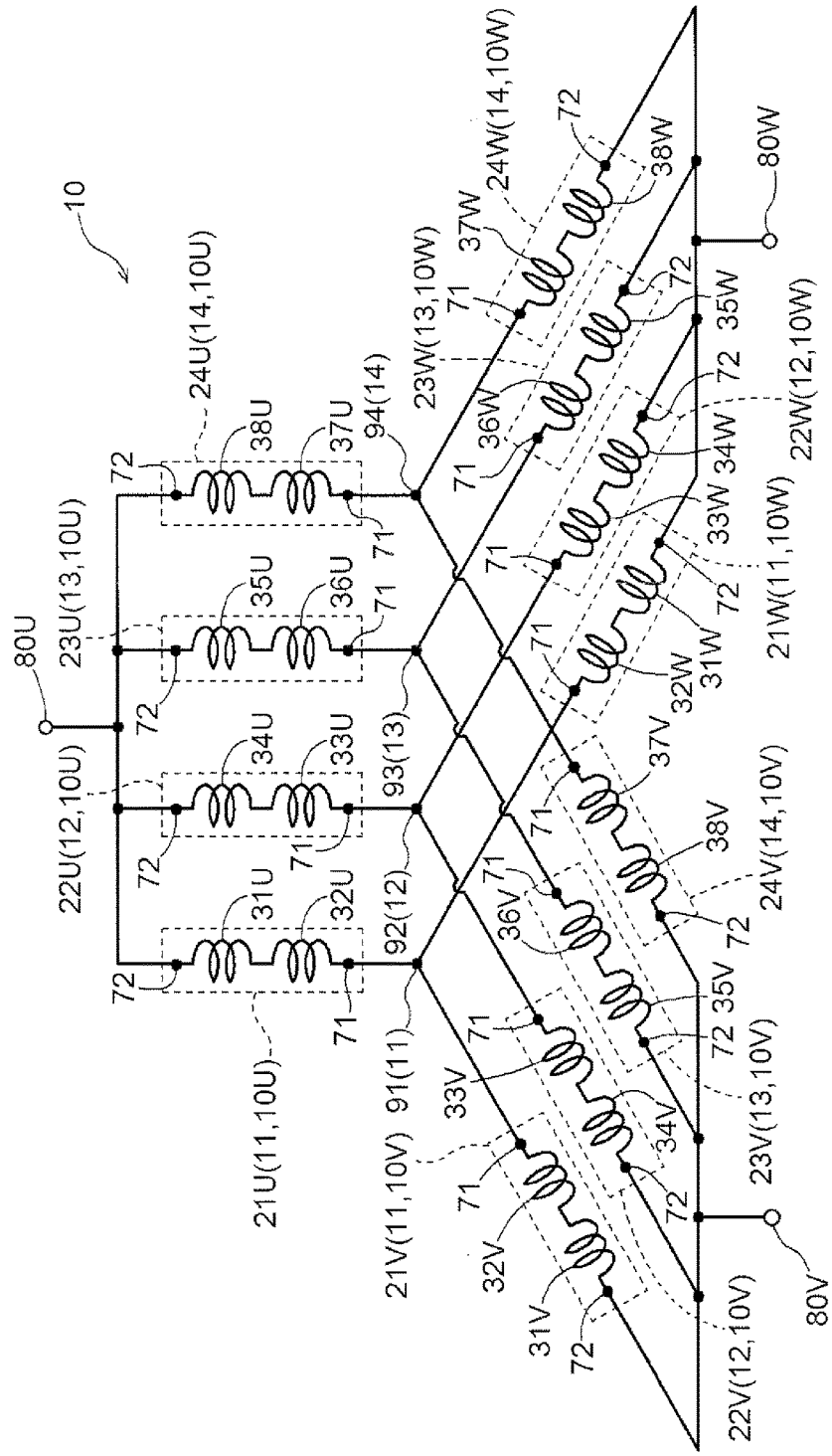
FIG. 12 is a connection diagram of a coil according to the second embodiment of the present invention.

As shown in FIG. 12, in the present embodiment, the coil 10 has four star connections, namely a first star connection 11, a second star connection 12, a third star connection 13, and a fourth star connection 14. Each of the four star connections 11 to 14 includes three phase coil portions corresponding to three phases, and first ends 71 of the three phase coil portions are connected together at a corresponding one of neutral points 91 to 94 that are formed independently for each of the star connections 11 to 14. In the present embodiment, each of the three phase coil portions included in each of the star connections 11 to 14 includes two unit coil portions.

Accordingly, in the present embodiment, a U-phase coil 10U includes a third U-phase phase coil portion 23U and a fourth U-phase phase coil portion 24U in addition to a first U-phase phase coil portion 21U and a second U-phase phase coil portion 22U. Similarly, a V-phase coil 10V includes a third V-phase phase coil portion 23V and a fourth V-phase phase coil portion 24V in addition to a first V-phase phase coil portion 21V and a second V-phase phase coil portion 22V, and a W-phase coil 10W includes a third W-phase phase coil portion 23W and a fourth W-phase phase coil portion 24W in addition to a first W-phase phase coil portion 21W and a second W-phase phase coil portion 22W. The coil 10 includes the third neutral point 93 and the fourth neutral point 94 in addition to the first neutral point 91 and the second neutral point 92.

Figure 11:
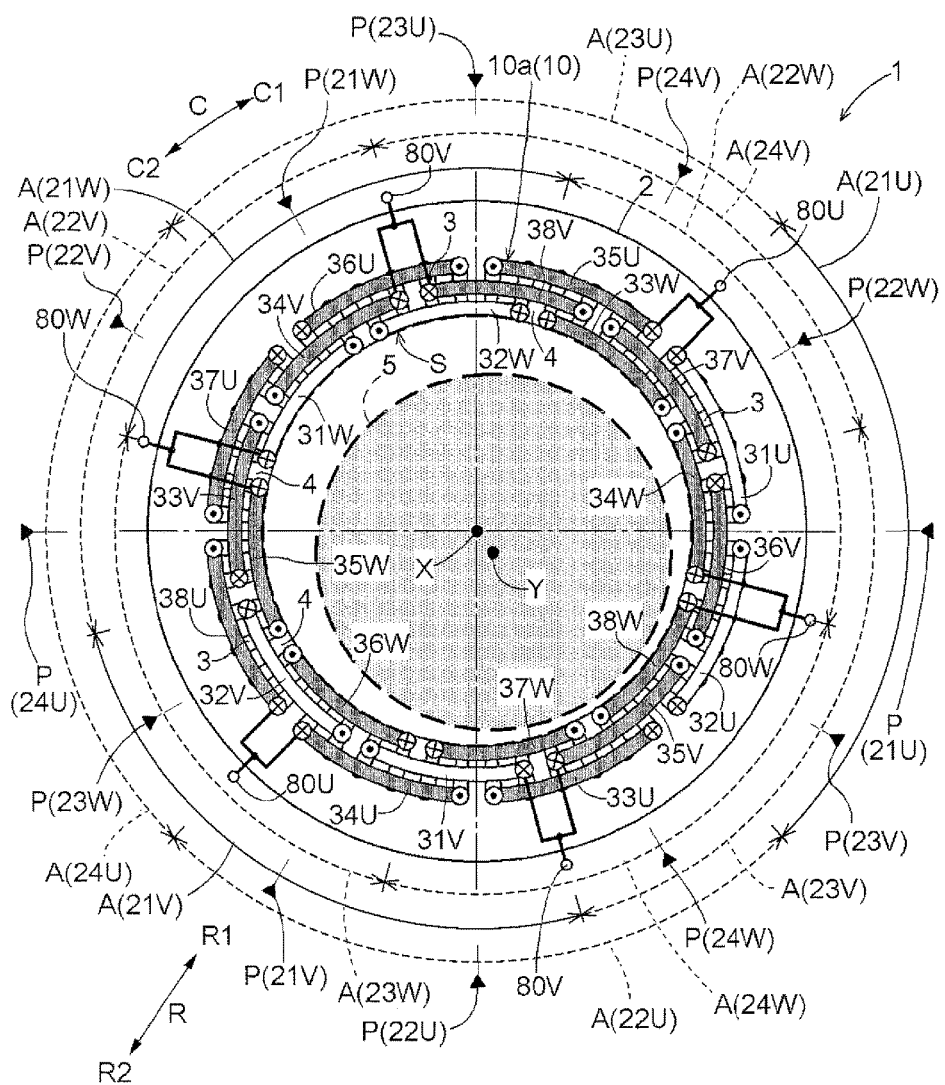
FIG. 11 is a diagram of a stator according to a second embodiment of the present invention as viewed in the axial direction.

As shown in FIG. 11, regarding all of the first V-phase phase coil portion 21V, the second V-phase phase coil portion 22V, the third V-phase phase coil portion 23V, and the fourth V-phase phase coil portion 24V, the center position P in the circumferential direction C of each of the V-phase phase coil portions 21V to 24V is shifted by 120° in the circumferential first direction C1 with respect to the center position P in the circumferential direction C of a corresponding one of the U-phase phase coil portions 21U to 24U which is included in the same star connection 11 to 14. Regarding all of the first W-phase phase coil portion 21W, the second W-phase phase coil portion 22W, the third W-phase phase coil portion 23W, and the fourth W-phase phase coil portion 24W, the center position P in the circumferential direction C of each of the W-phase phase coil portions 21W to 24W is shifted by 120° in the circumferential first direction C 1 with respect to the center position P in the circumferential direction C of a corresponding one of the V-phase phase coil portions 21V to 24V which is included in the same star connection 11 to 14. That is, in the present embodiment as well, the center position P in the circumferential direction C of each phase coil portion is designed to be located 120° away in the circumferential direction C from the center positions P in the circumferential direction C of the phase coil portions of the other phases included in the same star connection 11 to 14.

In the present embodiment, as shown in FIG. 11, each of phase coil placement regions A has a length of 90° in the circumferential direction C (to be exact, 90° minus the width in the circumferential direction C of one tooth 4). The plurality of (in this example, four) phase coil placement regions A of the same phase are designed so that the phase coil placement regions A adjoining each other in the circumferential direction C are shifted by 90° with respect to each other in the circumferential direction C. Accordingly, in the present embodiment, as shown in FIG. 11, the center position P in the circumferential direction C of each coil portion is located 90° away in the circumferential direction C from the center positions P in the circumferential direction C of the phase coil portions of the same phase which adjoin this coil portion in the circumferential direction C.

In the present embodiment as well, as shown in FIG. 11, the phase coil placement region A where the phase coil portion is placed is disposed so as to partially overlap the phase coil placement regions A where the phase coil portions of the other phases are respectively placed, as viewed in the radial direction R. In the present embodiment, however, as described above, each of the phase coil placement regions A has a length of 90° in the circumferential direction C. Accordingly, unlike the first embodiment, the phase coil placement region A where the phase coil portion is placed is disposed so as not to overlap the phase coil placement regions A where the phase coil portions of the other phases included in the same star connection 11 to 14 are respectively placed, as viewed in the radial direction R.

Even in the coil 10 according to the present embodiment, the center position P in the circumferential direction C of each phase coil portion is designed to be located 120° away in the circumferential direction C from the center positions P in the circumferential direction C of the phase coil portions of the other phases included in the same star connection 11 to 14. Accordingly, although the simulation result is omitted, in the coil 10 according to the present embodiment as well, variation among the three phase coil portions included in the same star connection 11 to 14 can be suppressed, regardless of the direction of the eccentricity, in the magnitude of a change in counter electromotive voltage generated in the eccentric state from the reference counter electromotive voltage and the direction of the change, and the difference in counter electromotive voltage between or among the plurality of (in this example, four) series connections forming the same parallel circuit can be reduced, as in the case of the coil 10 according to the first embodiment. In the present embodiment, as shown in FIG. 12, each parallel circuit in which a circulating current can be generated in the eccentric state has four shunts.

3. Third Embodiment

Figure 13:
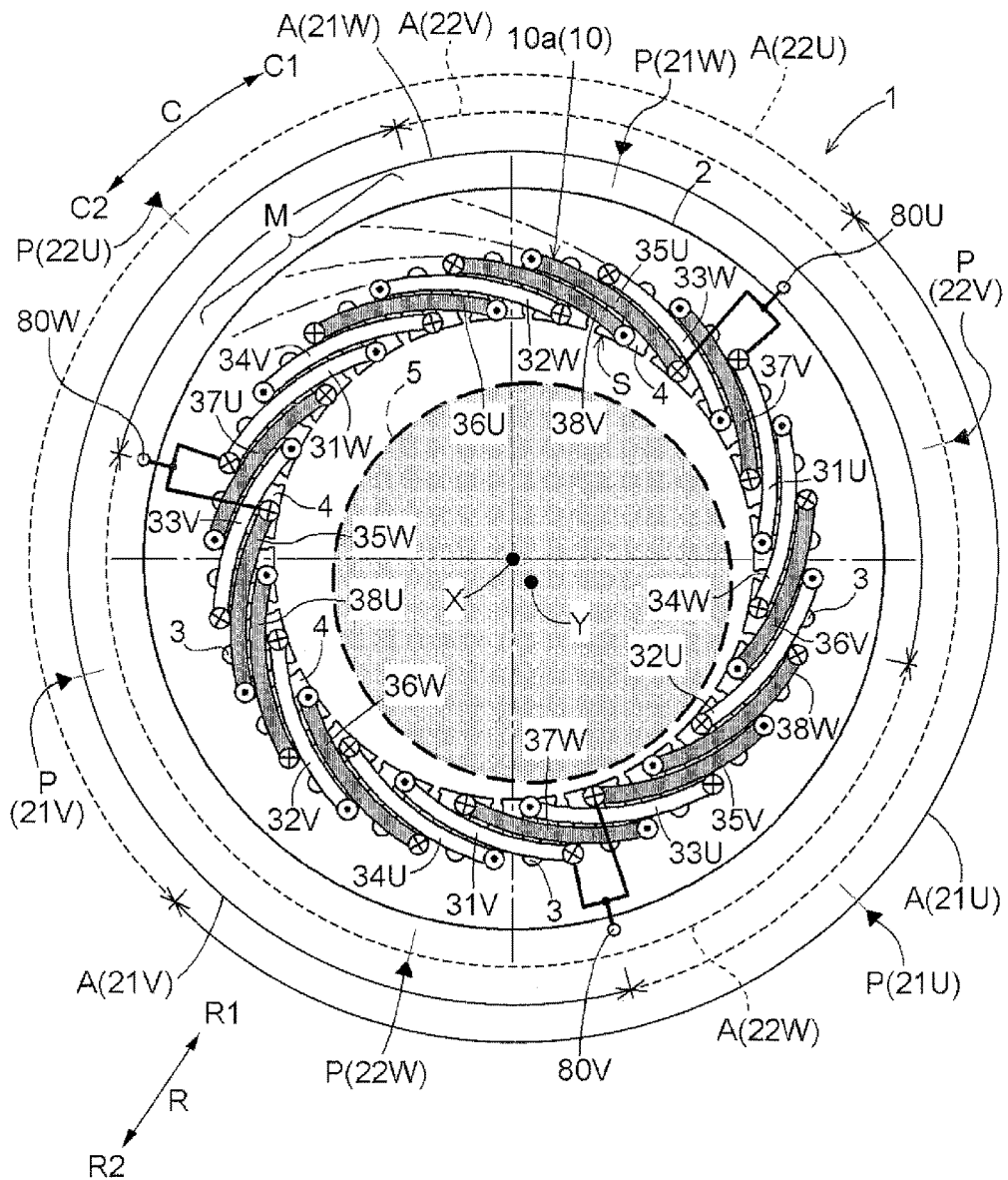
FIG. 13 is a diagram of a stator according to a third embodiment of the present invention as viewed in the axial direction.

A third embodiment of the coil according to the present invention will be described with reference to FIG. 13. Like FIG. 1, FIG. 13 shows only the turn portions of the unit coil portions, and does not show jumper portions and connection members that connect a coil end portion 10a and neutral points 91, 92. In the present embodiment, the shapes of U-phase unit coil portions 31U to 38U, V-phase unit coil portions 31V to 38V, and W-phase unit coil portions 31W to 38W (turn portions) as viewed in the axial direction L, and the overall arrangement and shape of the coil end portion 10a as viewed in the axial direction L are different from the first embodiment. In the first embodiment, as shown in FIG. 1, each unit coil portion (turn portion) has an arc shape along the circumferential direction C as viewed in the axial direction L. In the first embodiment, the unit coil portions of the three phases are designed to be arranged on concentric circles having different radii among the phases, as viewed in the axial direction L. Specifically, the U-phase unit coil portions 31U to 38U are arranged on the outermost one (the circle located outermost in the radial second direction R2 and having the largest radius) of three concentric circles corresponding to the three phases, namely U-phase, V-phase, and W-phase, the W-phase unit coil portions 31W to 38W are arranged on the innermost one (the circle located innermost in the radial first direction R1 and having the smallest radius) of the three concentric circles, and the V-phase unit coil portions 31V to 38V are arranged on the intermediate circle formed therebetween (the circle having a radius smaller than that of the outermost circle and larger than that of the innermost circle). In the first embodiment, since the unit coil portions are thus arranged on the concentric circles having different radii among the phases, the overall shape of the coil end portion 10a as viewed in the axial direction L is the shape of a triple circle about the stator axial center X. On the other hand, in the present embodiment, the U-phase unit coil portions 31U to 38U, the V-shape unit coil portions 31V to 38V, and the W-phase unit coil portions 31W to 38W are arranged in a radial spiral pattern about the stator axial center X, as viewed in the axial direction L. The differences from the first embodiment will be mainly described below, and the third embodiment is similar to the first embodiment unless otherwise specified.

In the present embodiment, each of the U-phase unit coil portions 31U to 38U, the V-shape unit coil portions 31V to 38V, and the W-phase unit coil portions 31W to 38W is placed so as to connect two slots 3 separated from each other at a 5-slot pitch. Each unit coil portion is placed so as to extend from radially inward (in this example, the radial first direction R1 side) to radially outward (in this example, the radial second direction R2 side) from its one end in the circumferential direction (in this example, on the circumferential first direction C1 side) to the other end in the circumferential direction (in this example, on the circumferential second direction C2 side), as viewed in the axial direction L. In this case, as shown in FIG. 13, the shape of the plurality of unit coil portions as viewed in the axial direction L is designed so that the plurality of unit coil portions are placed along a plurality of radial spiral lines M extending in the radial second direction R2 from the stator axial center X side. As used herein, the term "spiral line M" refers to a spiral planar curve (including a planar straight line, a planar broken line, etc.), and includes a spiral line M whose extended line does not pass through the stator axial center X.

Specifically, as shown in FIG. 13, the turn portion of each of the U-phase unit coil portions 31U to 38U is disposed in an arc shape along the spiral line M so that the end on the circumferential first direction C1 side of the turn portion is located in a region on the radial first direction R1 side of one of the pair of slots 3 and the end on the circumferential second direction C2 side of the turn portion is located in a region on the radial second direction R2 side of the other slot 3 that is separated from the slot 3 at a 5-slot pitch in the circumferential second direction C2. The turn portion of each of the V-phase unit coil portions 31V to 38V and the W-phase unit coil portions 31W to 38W is also disposed similarly. The turn portions of the plurality of unit coil portions are thus disposed along the plurality of radial spiral lines M that are different from each other, as viewed in the axial direction L. The coil end portion 10a having a spiral overall shape is formed in this manner.

In this case, two unit coil portions of different phases which adjoin each other in the circumferential direction C are arranged so as to partially overlap each other as viewed in the radial direction R. That is, each unit coil portion is disposed so that its one end in the circumferential direction (in this example, the end on the circumferential first direction C1 side) is located radially inward (in this example, on the radial first direction R1 side) of a different unit coil portion located at the same circumferential position and the other end in the circumferential direction (in this example, the end on the circumferential second direction C2 side) is located radially outward (in this example, on the radial second direction R2 side) of a different unit coil portion located at the same circumferential position. In the present embodiment, each of the unit coil portions of U-phase, V-phase, and W-phase adjoins the unit coil portion of one of the other phases in the circumferential first direction C1, and adjoins the unit coil portion of the other phase in the circumferential second direction C2. The unit coil portions are arranged in a repeated pattern of the U-phase unit coil portion, the V-phase unit coil portion, and the W-phase unit coil portion from the circumferential first direction C1 side to the circumferential second direction C2 side.

The phase coil placement region A in the present embodiment is a region corresponding to the sum of the regions (unit coil placement regions) in the circumferential direction C of the unit coil portions forming the phase coil portion in the case where these unit coil portions are arranged in the circumferential direction C. In the coil 10 according to the present embodiment as well, like the first embodiment, the phase coil placement region A is designed to be continuous in the circumferential direction C. In order to implement such a configuration, in the present embodiment, each unit coil portion of the phase coil portion is disposed so that one end in the circumferential direction (in this example, the end on the circumferential first direction C1 side) of the phase coil portion adjoins in the circumferential direction C the other end in the circumferential direction (in this example, the end on the circumferential second direction C2 side) of another unit coil portion of the same phase which is subsequent to this phase coil portion in order of electrical connection. In the coil 10 according to the present embodiment as well, the phase coil placement region A is disposed so as not to overlap the phase coil placement regions A where the other (N–1) (in this example, one) phase coil portions of the same phase are placed, as viewed in the radial direction. In the present embodiment, for example, the phase coil placement region A of the first U-phase phase coil portion 21U is disposed in the lower right region so as to be continuous with a length of 180° in the circumferential direction C, as viewed from the side closer to the viewer of FIG. 13. On the other hand, the phase coil placement region A of the second U-phase phase coil portion 22U is disposed in the upper left region so as to be continuous with a length of 180° in the circumferential direction C and so as not to overlap the phase coil placement region A of the first U-phase phase coil portion 21U, as viewed from the side closer to the viewer of FIG. 13.

In the coil 10 according to the present embodiment as well, the center position P in the circumferential direction C of each phase coil portion is located 120° away in the circumferential direction C from the center positions P in the circumferential direction C of the phase coil portions of the other phases included in the same star connection 11, 12. Accordingly, although the simulation result is omitted, in the coil 10 according to the present embodiment as well, variation among the three phase coil portions included in the same star connection 11, 12 can be suppressed, regardless of the direction of the eccentricity, in the magnitude of a change in counter electromotive voltage generated in the eccentric state from the reference counter electromotive voltage and the direction of the change, and the difference in counter electromotive voltage between or among the plurality of (in this example, two) series connections forming the same parallel circuit can be reduced, as in the case of the coil 10 according to the first embodiment.

In the present embodiment, each unit coil portion is disposed so that its end on the circumferential first direction C1 side is located on the radial first direction R1 side of a different unit coil portion located at the same circumferential position and its end on the circumferential second direction C2 side is located on the radial second direction R2 side of a different unit coil portion located at the same circumferential position, and the coil end portion 10a is thus formed so as to have a spiral pattern in the circumferential second direction C2. However, embodiments of the present invention are not limited to this. Each unit coil portion may be disposed so that its end on the circumferential second direction C2 side is located on the radial first direction R1 side of a different unit coil portion located at the same circumferential position and its end on the circumferential first direction C1 side is located on the radial second direction R2 side of a different unit coil portion located at the same circumferential position, and the coil end portion 10a may thus be formed so as to have a spiral pattern in the opposite direction to that in the example of FIG. 13.

4. Other Embodiments

Lastly, other embodiments of the coil according to the present invention will be described. Configurations disclosed in each of the following embodiments can be combined with those disclosed in other embodiments as appropriate unless inconsistency arises.

(1) The first embodiment is described with respect to an example in which "N" is "2," and the second embodiment is described with respect to an example in which "N" is "4." However, embodiments of the present invention are not limited to this. For example, the present invention may be configured so that "N" is an integer of 2 or more but is other than "2" and "4," such as a configuration in which "N" is "8" etc.

(2) Each of the above embodiments is described with respect to an example in which the plurality of unit coil portions included in the same phase coil portion are arranged in the same order in the circumferential direction C as the order of electrical connection. However, embodiments of the present invention are not limited to this. The plurality of unit coil portions included in the same phase coil portion may be arranged in different order in the circumferential direction C from the order of electrical connection. For example, in the configuration of the first embodiment (see FIG. 1), the first U-phase phase coil portion 21U may include the first U-phase unit coil portion 31U, the third U-phase unit coil portion 33U, the second U-phase unit coil portion 32U, and the fourth U-phase unit coil portion 34U in order of electrical connection. That is, the phase coil portion may have an alternate pole winding structure.

(3) Each of the above embodiments is described with respect to an example in which the unit coil portion is a coil portion having a plurality of turns between a pair of slots 3. However, embodiments of the present invention are not limited to this. The unit coil portion may be a coil portion having pluralities of turns between multiple pairs of slots 3. For example, the unit coil portion may be a coil portion having pluralities of turns between two pairs of slots 3. In this case, for example, two slots 3 adjoining each other in the circumferential direction C (adjoining slot pair) and another adjoining slot pair that is separated from this adjoining slot pair at a pitch of one magnetic pole in the circumferential direction C may be the four slots 3 in which the unit coil portion is wounded.

(4) Each of the above embodiments is described with respect to an example in which the stator core 2 corresponds to the "core" in the present invention. However, embodiments of the present invention are not limited to this. For example, a fixed magnetic field type (rotating armature type) rotating electrical machine may be used as the rotating electrical machine, and the coil 10 may be wound around the rotor core of the rotor 5. In this case, unlike the above embodiments, the axial center of the core reference plane S matches the rotor axial center Y.

(5) Each of the above embodiments is described with respect to an example in which the stator core 2 around which the coil 10 is wound is a stator core of a stator for inner rotor type rotating electrical machines. However, embodiments of the present invention are not limited to this. A stator core of a stator for outer rotor type rotating electrical machines may be used as the stator core around which the coil 10 is wound. In this case, unlike the above embodiments, the rotor 5 is placed on the radial second direction R2 side (radially outward) of the stator core 2.

(6) Regarding other configurations as well, the embodiments disclosed in the specification are by way of example only in all respects, and embodiments of the present invention are not limited to these. That is, those configurations which are not described in the claims of the present application may be modified as appropriate without departing from the object of the present invention.

INDUSTRIAL APPLICABILITY

The present invention can be preferably used for coils that are wound around a core having a plurality of slots arranged so as to be distributed in the circumferential direction of a cylindrical core reference plane, and that have a plurality of star connections.

DESCRIPTION OF THE REFERENCE NUMERALS

2: Stator Core (Core)
3: Slot
10: Coil
11: First Star Connection (Star Connection)
12: Second Star Connection (Star Connection)
13: Third Star Connection (Star Connection)
14: Fourth Star Connection (Star Connection)
21U to 24U: U-Phase Phase Coil Portion (Phase Coil Portion)
21V to 24V: V-Phase Phase Coil Portion (Phase Coil Portion)
21W to 24W: W-Phase Phase Coil Portion (Phase Coil Portion)
31U to 38U: U-Phase Unit Coil Portion (Unit Coil Portion)
31V to 38V: V-Phase Unit Coil Portion (Unit Coil Portion)
31W to 38W: W-Phase Unit Coil Portion (Unit Coil Portion)
71: First End
72: Second End
91: First Neutral Point (Neutral Point)
92: Second Neutral Point (Neutral Point)
93: Third Neutral Point (Neutral Point)
94: Fourth Neutral Point (Neutral Point)
A: Phase Coil Placement Region
C: Circumferential Direction
P: Center Position
R: Radial Direction
S: Core Reference Plane

The invention claimed is:

1. A coil that is wound around a core having a plurality of slots arranged so as to be distributed in a circumferential direction of a cylindrical core reference plane, and that has N star connections, where N is an integer of 2 or more, wherein
each of the N star connections includes three phase coil portions, with one phase coil portion for each of respective three phases,
a phase coil placement region where a phase coil portion is placed is designed to be continuous in the circumferential direction, and is disposed so as not to overlap a phase coil placement region where another phase coil portion of the same phase is placed, where N−1 is the number of other phase coil portions, as viewed in a radial direction, and
a center position in the circumferential direction of each of the phase coil portions is designed to be located 120° away in the circumferential direction from center positions in the circumferential direction of the phase coil portions of the other phases which are included in the same star connection, wherein:
each phase has N phase coil portions, and each phase coil portion includes a plurality of unit coil portions each having a plurality of turns between a pair of slots or having pluralities of turns between multiple pairs of slots, and
each of the unit coil portions are arranged so as to extend from radially inward to radially outward from one end in the circumferential direction to the other end in the circumferential direction, as viewed in the axial direction, such that:
one portion of a first unit coil portion of a first phase in one slot is radially outside a second unit coil portion of a second phase adjacent to the first unit coil portion and another portion of the first unit coil portion in another slot is radially inside a third unit coil portion of a third phase adjacent to the first unit coil portion, and each unit coil portion is disposed so as to not overlap another unit coil portion of the same phase coil portion of the same star connection, as viewed in the radial direction.

2. The coil according to claim 1, wherein the phase coil placement region where the phase coil portion is placed is disposed so as to partially overlap the phase coil placement regions where the phase coil portions of the other phases are placed, as viewed in the radial direction.

3. The coil according to claim 1, wherein first ends of the three phase coil portions are connected together at a neutral point that is formed independently for each of the star connections.

4. The coil according to claim 1, wherein second ends of the N phase coil portions of the same phase which are included in the different star connections are connected to each other.

5. The coil according to claim 1, wherein the plurality of unit coil portions included in the same phase coil portion are arranged in the same order in the circumferential direction as order of electrical connection.

6. The coil according to claim 1, wherein each phase has a first phase coil portion of the N phase coil portions with a first set of unit coil portions arranged in a clockwise order and a second phase coil portion of the N phase coil portions with a second set of unit coil portions arranged in a counterclockwise order.

* * * * *